(12) United States Patent
Kim et al.

(10) Patent No.: US 11,498,313 B2
(45) Date of Patent: Nov. 15, 2022

(54) FILM FOR GLASS LAMINATION, LAMINATED GLASS COMPRISING SAME, AND TRANSPORTATION VEHICLE COMPRISING LAMINATED GLASS

(71) Applicant: SKC Co., Ltd., Suwon-si (KR)

(72) Inventors: Hyejin Kim, Suwon-si (KR); Jiyeon Ryu, Suwon-si (KR); Sungjin Chung, Seoul (KR); Heungsik Kim, Seoul (KR)

(73) Assignee: SKC CO., LTD., Suwon-si (KR)

( * ) Notice: Subject to any disclaimer, the term of this patent is extended or adjusted under 35 U.S.C. 154(b) by 11 days.

(21) Appl. No.: 17/144,293

(22) Filed: Jan. 8, 2021

(65) Prior Publication Data
US 2021/0129496 A1 May 6, 2021

Related U.S. Application Data

(63) Continuation of application No. PCT/KR2019/002735, filed on Mar. 8, 2019.

(30) Foreign Application Priority Data

Jul. 12, 2018 (KR) .................. 10-2018-0081042

(51) Int. Cl.
| | |
|---|---|
| *B32B 17/10* | (2006.01) |
| *B32B 7/12* | (2006.01) |
| *C08K 5/159* | (2006.01) |
| *C09J 7/10* | (2018.01) |
| *C09J 129/04* | (2006.01) |

(52) U.S. Cl.
CPC ............ *B32B 17/1066* (2013.01); *B32B 7/12* (2013.01); *B32B 17/10* (2013.01); *B32B 17/10036* (2013.01); *B32B 17/10761* (2013.01); *C08K 5/159* (2013.01); *C09J 7/10* (2018.01); *C09J 129/04* (2013.01); *B32B 2250/03* (2013.01); *B32B 2250/40* (2013.01); *B32B 2307/4026* (2013.01)

(58) Field of Classification Search
CPC ...................................... C08L 29/14
See application file for complete search history.

(56) References Cited

U.S. PATENT DOCUMENTS

| 4,352,911 A | 10/1982 | Spence |
| 6,264,731 B1 * | 7/2001 | Gundlach ............ C09D 11/30 106/31.43 |

(Continued)

FOREIGN PATENT DOCUMENTS

| CN | 102643309 B | 4/2014 |
| JP | 4-175248 A | 6/1992 |

(Continued)

OTHER PUBLICATIONS

International Search Report dated Jul. 5, 2019 in counterpart International Patent Application No. PCT/KR2019/002735 (2 pages in English and 2 pages in Korean).

*Primary Examiner* — Ian A Rummel
(74) *Attorney, Agent, or Firm* — NSIP Law (57) ABSTRACT

A film for glass lamination includes a pigment portion occupying some or a whole of the film, wherein the pigment portion includes a polyvinyl acetal resin, a pigment, a plasticizer, and a trioxane-based compound.

13 Claims, 5 Drawing Sheets

(56) References Cited

U.S. PATENT DOCUMENTS

| | | | | |
|---|---|---|---|---|
| 2004/0157078 | A1* | 8/2004 | Yoshida | B41M 5/5254 |
| | | | | 428/524 |
| 2008/0233377 | A1* | 9/2008 | Smith | B32B 17/10339 |
| | | | | 428/220 |
| 2015/0322282 | A1* | 11/2015 | Matsumoto | C09D 11/38 |
| | | | | 524/104 |

FOREIGN PATENT DOCUMENTS

| | | |
|---|---|---|
| JP | 5-84738 A | 4/1993 |
| JP | 3951146 B2 | 8/2007 |
| JP | 2014-76918 A | 5/2014 |
| JP | 6192281 B2 | 9/2017 |
| KR | 10-2007-0106619 A | 11/2007 |
| KR | 10-2008-0025005 A | 3/2008 |
| KR | 10-2017-0093222 A | 8/2017 |

* cited by examiner

FILM FOR GLASS LAMINATION, LAMINATED GLASS COMPRISING SAME, AND TRANSPORTATION VEHICLE COMPRISING LAMINATED GLASS

CROSS-REFERENCE TO RELATED APPLICATIONS

This application is a continuation of International Application No. PCT/KR2019/002735 filed on Mar. 8, 2019, which claims the benefit of Korean Patent Application No. 10-2018-0081042 filed on Jul. 12, 2018, in the Korean Intellectual Property Office, the entire disclosures of which are incorporated herein by reference for all purposes.

BACKGROUND

1. Field

The present disclosure relates to a film for glass lamination, laminated glass comprising a film for glass lamination, and a transportation vehicle comprising laminated glass.

2. Description of Background

Laminated glass (e.g., tempered glass and safety glass) consisting of a pair of glass panels and a synthetic resin film inserted therebetween is widely used for window glass in buildings and vehicles such as automobiles, aircraft, boats, etc. because of its enhanced safety due to the fact that its fragments are not scattered even when the glass is broken. In some cases, a polyvinyl acetal resin having a high affinity for inorganic materials is utilized in the film applied to such laminated glass.

Functions of the laminated glass include preventing penetration through laminated glass (penetration resistance) and absorbing energy caused from impact to minimalize damage or injury of objects or people inside the transparent walls (impact resistance). In addition, an objective of laminated glass may be to have excellent optical properties applicable to clear glass, and also have robust environmental degradation resistant properties such as to moisture (optical properties and moisture resistance). And, the laminated glass may include a colored part for shielding blinding light, or may be colored overall when applied to sunroofs and the like.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a film for glass lamination includes a pigment portion occupying some or a whole of the film, wherein the pigment portion includes a pigment layer including a polyvinyl acetal resin, a pigment, a plasticizer, and a trioxane-based compound.

The pigment portion may have a hue deviation of 0.4 or less.

The pigment layer may include the pigment and the trioxane-based compound in a weight ratio of pigment to trioxane-based compound of 1:0.05 to 3.

The pigment may be included in an amount of 0.001 to 5 wt % with respect to a total weight of the pigment portion.

The trioxane-based compound may be a trioxane-based compound having 9 to 15 carbon atoms.

A haze value of the film for laminating glass may have a difference within 15% after a moisture resistance test, which includes digesting the film in deionized water of 50° C. for 3 hours, compared to a haze value of the film for laminating glass before the moisture resistance test.

A light transmitting laminate may include a first light transmitting layer, the film for glass lamination located on one side of the first light transmitting layer, and a second light transmitting layer located on one side of the film for glass lamination.

A vehicle may include the light transmitting laminate.

In another general aspect, a pigment dispersion liquid includes a pigment and a trioxane-based compound.

The pigment dispersion liquid may further include a plasticizer.

The plasticizer may be included in an amount of 68 to 98 wt % with respect to a total amount of the pigment dispersion liquid.

The pigment may be included in an amount of 1 to 10 wt % with respect to a total amount of the pigment dispersion liquid.

The pigment dispersion liquid may be applied in an amount of 2 to 75 parts by weight based on a polyvinyl acetal resin in an amount of 100 parts by weight.

The pigment dispersion liquid may not generate agglomeration for 30 days or more after being prepared.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that the present disclosure is not limited to the examples presented.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

In the present specification, the term "combination of" included in Markush type description means mixtures or combinations of one or more elements described in Markush type and thereby means that the disclosure includes one or more elements selected from the Markush group.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

Herein, weight average molecule quantity or number average molecule quantity is expressed with omitting Dalton (Da) that is the unit. The weight average molecule quantity and so on are described based on the values measured using GPC (gel permeation chromatography)—ELSD (Evaporative Light Scattering Detector), however the measuring method is not limited thereto.

In one or more example embodiments a film for glass lamination having a pigment portion in which dispersion stability of pigments is improved as described herein, by applying a pigment dispersion liquid to the film for glass lamination.

As described herein, problems in processes of manufacturing a film for glass lamination applying a pigment mixture, such as difficulty in even color development, and gelation of a pigment dispersion liquid in processes of manufacturing were discovered. An unexpected way for addressing the problems was also discovered, and as a result, according to example embodiments as described herein, it was verified that when a pigment dispersion liquid was prepared by applying a trioxane-based compound overall even color development was possible and long-term storage stability was also improved.

Hereinafter, example embodiments will be described in further detail.

Figure 1A:
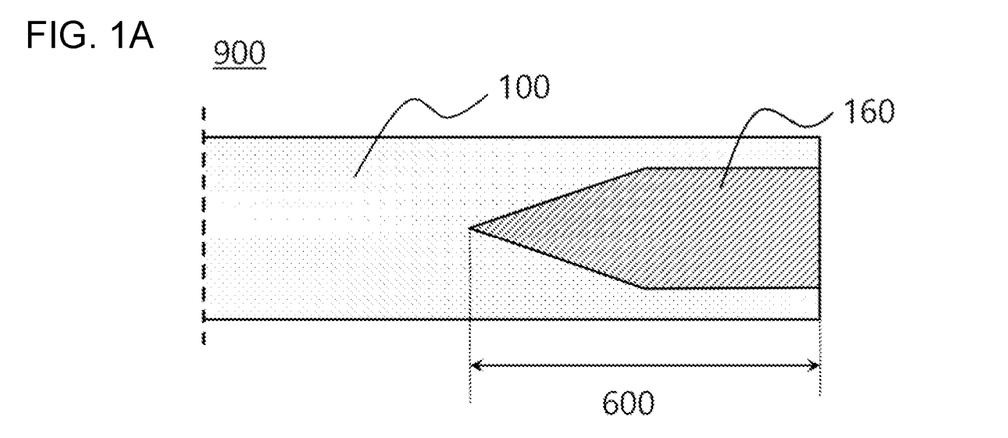
FIGS. 1A and 1B are conceptual views illustrating sections of a film for glass lamination including a pigment portion in the form of a shade band, respectively, according to one or more examples.
Figure 1B:
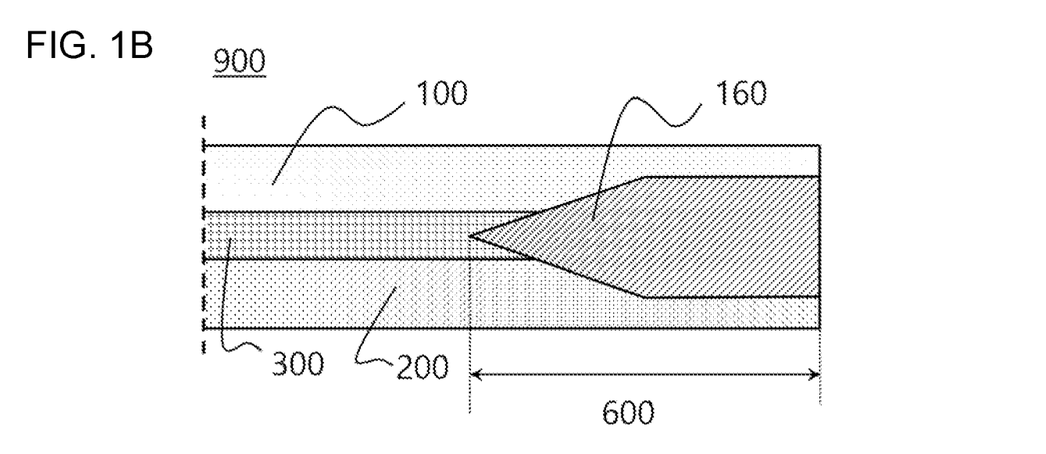

FIGS. 1A and 1B are conceptual views illustrating sections of a film for glass lamination comprising a pigment portion in the form of a shade band, respectively, according to one or more examples. FIGS. 2A and 2B, and FIGS. 3A and 3B are conceptual views illustrating sections of a film for glass lamination including a pigment portion occupying the whole area of the film, respectively, according to one or more examples. Referring to FIGS. 1A and 1B to FIGS. 3A and 3B, a film for glass lamination and a dispersion liquid according to one or more examples is described.

In a general aspect, a film for glass lamination 900 comprises a pigment portion 600 occupying some or the whole of the film.

The pigment portion 600 may be formed in some or the whole of the film 900.

The pigment portion 600 may have a pigment layer 160, for example, in the form of a shade band comprised in the film 900, or some layer within the film 900 which is a laminate structure having two or more layers may be a pigment layer 160. In addition, the film 900 may be a film with a monolayer structure of which the whole consists of a pigment layer 160.

The pigment layer 160 comprises a polyvinyl acetal resin, a pigment, a plasticizer, and a trioxane-based compound.

As for a color applied to a shade band of an interlayer for glass lamination, blue hues are highly preferred. Such a color of the shade band may have a hue between violet and blue, and for making this hue at least two pigments are applied together.

To disperse the pigment evenly and stably, example embodiments apply a trioxane-based compound.

The trioxane-based compound may be one or more within a trioxane-based compound having 1,3,5-trioxane skeleton, a trioxane-based compound having 1,2,4-trioxane skeleton, and a trioxane-based compound having 1,2,3-trioxane skeleton.

The trioxane-based compound may be one having 1,3,5-trioxane skeleton in which 1 to 3 carbon atoms out of the 3 carbon atoms comprised in the skeleton may independently have hydrogen or alkyl group having 1 to 5 carbon atoms, respectively, as having structure of Formula 1 below.

[Formula 1]

In the Formula 1, the R1, R2, and R3 are independently hydrogen or alkyl group having 1 to 5 carbon atoms, respectively.

Specifically, the R1, R2, and R3 are independently hydrogen or alkyl group having 1 to 5 carbon atoms, respectively, except the case in which all the R1, R2, and R3 are hydrogen.

In a case of applying the trioxane-based compound to the film for glass lamination like this, a hydrophilic part caused from a trioxane skeleton and a hydrophobic part caused from alkyl group of R1 to R3 are present together thereby improving stability when a pigment and a plasticizer are mixed.

The trioxane-based compound may be trialkyl trioxane, and may be specifically any one selected from the group consisting of 2,4,6-trimethyl-1,3,5-trioxane, 2,4,6-triethyl-1,3,5-trioxane, 2,4,6-tri(n-propyl)-1,3,5-trioxane, 2,4,6-tri(iso-propyl)-1,3,5-trioxane, 2,4,6-tri(n-butyl)-1,3,5-trioxane, 2,4,6-tri(sec-butyl)-1,3,5-trioxane, 2,4,6-tri(isobutyl)-1,3,5-trioxane, 2,4,6-tri(tert-butyl)-1,3,5-trioxane, 2,4,6-tripentyl-1,3,5-trioxane, and combinations thereof.

The trioxane-based compound may be a trioxane-based compound having carbon atoms of 9 or more, of 9 to 21, or of 9 to 15. Specifically, the trialkyl trioxane may be tripropyl trioxane, and may be specifically any one selected from the group consisting of 2,4,6-tri(n-propyl)-1,3,5-trioxane, 2,4,6-tri(iso-propyl)-1,3,5-trioxane, and combinations thereof.

As for the trioxane-based compound of example embodiments, the trialkyl trioxane having carbon atoms of 9 to 15 has properties having characteristics between a pigment and a plasticizer in a pigment dispersion liquid so that even when applied in a trace amount can function as improving dispersion stability exceptionally well and preventing agglomeration or re-agglomeration of pigments.

The trioxane-based compound may be included in an amount of 0.001 to 5 wt %, or of 0.001 to 3 wt % with respect to a total weight of the pigment layer. When the pigment layer comprises the trioxane-based compound in this range of content, the re-agglomeration of pigments can be prevented more efficiently.

To the pigment two or more pigments may be mixed and applied, or a pigment mixture comprising at least four or more pigments may be applied. For example, the pigment may be applied by mixing red, green, blue, yellow and so on, and the type is not limited specially.

As a red pigment, quinacridone red, monoazo red, polyazo red, pyranthrone red, antanthrone bromide red, perylene red, beta naphthol red, quinaoridone red, anthraquinone red, toluidine red, and so on are examples that may be applied, and specifically quinacridone red may be applied.

As a green pigment, phthalocyanine-based pigments comprising copper phthalocyanine green, copper phthalocyanine bromide green, and the like; chrome oxide green, chrome green, metal complex azo green, and so on are examples that may be applied, and specifically phthalocyanine-based pigments may be applied.

As a blue pigment, copper phthalocyanine blue, prussian blue, cobalt blue, indanthrone blue, ultramarine blue, and metal frit palocyanine blue may be applied, and specifically phthalocyanine blue may be applied.

As a yellow pigment, azo yellow, such as monoazo yellow, polyazo yellow, monoazo benzimidazolone yellow, metal complex azo yellow; benzimidazole yellow, quinacridone gold, isoindolin yellow, anthrapyramidine yellow, flavanthrone yellow, quinophthalone yellow, anthraquinone yellow, chrome yellow, and the like, and specifically, azo yellow may be applied.

As the pigment a mixed pigment may be applied by mixing a green pigment in an amount of 0.1 to 2 parts by weight, a blue pigment in an amount of 0.1 to 2 parts by weight, and a yellow pigment in an amount of 0.1 to 2 parts by weight based on the red pigment in an amount of 1 parts by weight.

The pigment may have a particle size of 150 nm (nanometers) or less, or of 10 to 100 nm.

The pigment may be comprised in an amount of 0.001 to 5 wt %, of 0.005 to 3 wt %, or of 0.01 to 2 wt % with respect to a total weight of the pigment portion 600. The amount of the pigment comprised in the pigment portion 600 may be controlled by adjusting the amount of the pigment applied to the pigment layer 160 considering the intensity of the color, light transmittance and the like to be obtained in the pigment portion of the film overall.

The pigment layer 160 may comprise the pigment and the trioxane-based compound in a weight ratio of pigment to trioxane-based compound of 1:0.05 to 3. When the trioxane-based pigment is comprised in an amount of less than 0.05 based on the pigment in an amount of 1 parts by weight, dispersion stability may not be sufficient, and when the trioxane-based pigment is comprised in an amount of more than 3 parts by weight, the degree of improving dispersion stability obtained by adding a trioxane-based compound may be insignificant.

The pigment layer 160 may comprise the pigment and the trioxane-based compound in a weight ratio of pigment to trioxane-based compound of 1:0.05 to 2, or of 1:0.05 to 1.5.

When the pigment and the trioxane-based compound are applied in this range, other physical properties of the film for glass lamination and the effect of improving dispersion stability of the pigment can be obtained harmoniously.

The pigment comprised in the pigment layer 160 may be applied in the form of a pigment dispersion liquid comprising a pigment and a trioxane-based compound. At this time, the description about the pigment and trioxane-based compound is the same as described above.

The pigment dispersion liquid may further comprise a plasticizer, and the plasticizer may be selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibutoxyethoxyethyl adipate (DBEA), butyl carbitol adipate (DBEEA), dibutyl sebacate (DBS), bis 2-hexyl adipate (DHA) and mixtures thereof. Specifically, triethylene glycol bis 2-ethylhexanoate (3G8) may be applied as the plasticizer.

The plasticizer may be comprised in an amount of 68 to 98 wt % with respect to a total weight of the pigment dispersion liquid. When the pigment layer 160 of a polyvinyl acetal film is formed by preparing the pigment dispersion liquid including a plasticizer like this, convenience and workability in processes of manufacturing can be enhanced. In addition, the pigment dispersion liquid prevents agglomeration of the pigment and helps to manufacture a film with an even hue because a plasticizer and a pigment are applied with a trioxane-based compound which functions as a dispersion stabilizer.

In general, when a pigment in powder form is added to a plasticizer in liquid form, a wetting process of covering the surface of pigment particles that has been covered with air and moisture in air, with the plasticizer is required. The wetting process is carried out by dispersing pigment particles inside a plasticizer with strong physical force such as grinding and milling. At this time, pigment particles having considerably small size get to have an unstable state in which the surface area and surface free energy are increased. Particularly, when compatibility of a plasticizer and a pigment is not good, from this unstable state the force to return to a stable state in which the surface area is small is generated, and generally the force causes re-agglomeration of the pigment. However, this may cause degradation of even color development, storage stability of the pigment dispersion liquid, and the like.

In example embodiments these problems were solved by applying a trioxane-based compound. Specifically, by adding alkyl group having non-polarity to trioxane skeleton having polarity, the dispersion is stabilized between the pigment and the plasticizer having different properties from each other. The trioxane-based compound may be comprised in an amount of 0.1 to 30 wt % with respect to a total weight of the pigment dispersion liquid.

The pigment may be comprised in an amount of 1 to 10 wt % with respect to a total weight of the pigment dispersion liquid. If the pigment dispersion liquid comprises the pigment in this range of content, the dispersion stability of the pigment is improved and simultaneously when the pigment dispersion liquid is mixed with a polyvinyl acetal resin the workability can be enhanced.

The pigment dispersion liquid comprises the pigment, the trioxane-based compound and so on, and after being mixed with a plasticizer passes through a physical mixing process such as grinding and ball milling. Specifically, the pigment dispersion liquid may grind pigment particles agglomerated by the method of ball milling after each ingredient has been mixed, to be dispersed inside the dispersion liquid evenly. Further, the pigment dispersion liquid may be prepared through a dispersion process of ball milling for 30 minutes or more using a zirconium oxide ball having a diameter of 1 mm or less.

The pigment dispersion liquid may be one of which agglomeration does not occur for 30 days or more after being prepared. The case of the pigment dispersion liquid of which agglomeration does not occur for a relatively long period of time like this, means that the pigment dispersion liquid has improved storage stability, and convenience for work may be enhanced.

The pigment layer 160 comprises the pigment dispersion liquid and a polyvinyl acetal resin.

The pigment dispersion liquid may be applied in an amount of 2 to 75 parts by weight, or of 5 to 55 parts by weight based on the polyvinyl acetal resin in an amount of 100 parts by weight. In this case the polyvinyl acetal film may obtain physical properties as a film for glass lamination and simultaneously may obtain even color stably.

The polyvinyl acetal may be a polyvinyl acetal obtained by acetalization of a polyvinyl alcohol having a degree of polymerization of 1,600 to 3,000 with aldehyde, or may be a polyvinyl acetal obtained by acetalization of a polyvinyl alcohol having a degree of polymerization of 1,700 to 2,500 with aldehyde. When such a polyvinyl acetal is applied, mechanical properties like penetration resistance can be sufficiently improved.

The polyvinyl acetal may be one synthesized from polyvinyl alcohol and aldehyde, and the type of aldehyde is not limited. For example, the aldehyde may be any one selected from the group consisting of n-butyl aldehyde, isobutyl aldehyde, n-valeral aldehyde, 2-ethyl butyl aldehyde, n-hexyl aldehyde, and blend resins thereof. When n-butyl aldehyde is applied as the aldehyde, the produced polyvinyl acetal resin may have a characteristic in refractive index of which the difference with refractive index of glass is small, and a characteristic of excellent adhesion with glass and the like.

A first layer 100 of the film for glass lamination 900 may comprise a first polyvinyl acetal and a first plasticizer.

The first polyvinyl acetal may have hydroxyl group in an amount of 30 mol % or more and acetyl group in an amount of 5 mol % or less. Specifically, the amount of hydroxyl group may be 30 to 50 mol %, and the amount of acetyl group may be 2 mol % or less. The first polyvinyl acetal resin may have a value of weight average molecular quantity of 200,000 to 300,000. When a polyvinyl acetal having these characteristics is applied as the first polyvinyl acetal, a film for glass lamination having excellent adhesion with glass and excellent mechanical strength can be manufactured.

The description about the first plasticizer is duplicated with the above description about the plasticizer, thus further description will be omitted here.

The first layer 100 may be one formed to a film by melting extruding a composition for a first surface layer, which comprises a plasticizer and a first polyvinyl acetal and further comprises an extra additive described below in a needed range.

When the film for glass lamination 900 comprises a first layer 100 and a pigment layer 160 which is a shade band it has structure of a section like shown in FIG. 1A.

The film for glass lamination 900 comprising a first layer 100 and a pigment layer 160 which is a shade band may further comprise a second layer 200, and may further comprise a third layer 300 between the first layer 100 and the second layer 200. In this case, the film for glass lamination 900 has structure of a section like shown in FIG. 1B.

The second layer 200 may comprise a second polyvinyl acetal resin and a second plasticizer, and if it is required, further comprise an additive described below.

The second polyvinyl acetal resin and the second plasticizer may be the same as the first polyvinyl acetal resin and the first plasticizer described above, respectively.

The third layer 300 as a sound insulating layer, may comprise a third polyvinyl acetal and a third plasticizer.

The third polyvinyl acetal may have hydroxyl group in an amount of 40 mol % or less and acetyl group in an amount of 8 mol % or more, or the third polyvinyl acetal may have hydroxyl group in an amount of 1 to 30 mol % and acetyl group in an amount of 1 to 15 mol %. When a polyvinyl acetal having this characteristic is applied, a polyvinyl acetal film having a sound insulting characteristic can be manufactured.

The third polyvinyl acetal may have a value of weight average molecular quantity of 490,000 to 850,000, of 610,000 to 820,000, or of 690,000 to 790,000. The third polyvinyl acetal resin may have a value of weight average molecular quantity of 700,000 to 760,000, or of 720,000 to 750,000. In this case, the effect of improved co-extrusion workability and enhanced mechanical properties of the manufactured film can be simultaneously achieved.

The third polyvinyl acetal resin and the first polyvinyl acetal resin may have a difference in values of weight average molecular quantity, and the difference may be 250,000 to 500,000, 300,000 to 500,000, or 450,000 to 500,000. In the case of having such a difference in values of weight average molecular quantity, the third polyvinyl acetal and the first polyvinyl acetal have superior properties in terms of extrusion temperature control during the process, and can further improve mechanical properties of the manufactured film.

The third polyvinyl acetal resin may have a PDI (polydispersity index) value of 3.5 or less, of 1.2 to 2.5, or of 1.9 to 2.3.

The third polyvinyl acetal may have a melt index in accordance with ASTM D1238 (150° C., 21.6 kg, 37% Kneader) of 5 to 45 g/10 min. Specifically the melt index of the third polyvinyl acetal may be 6 to 35 g/10 min, 7 to 25 g/10 min, 8 to 15 g/10 min, or 8.5 to 12.5 g/10 min. When the third polyvinyl acetal resin has such a melt index, stability in processes may be enhanced.

The third polyvinyl acetal resin may have a value of viscosity (5% BuOH Sol.) in accordance with JIS K6728 of 250 to 900 cP, or of 500 to 750 cP. When the third polyvinyl acetal resin satisfies such a viscosity condition, mechanical properties of the film can be enhanced and efficiency in processes during melting and extruding can be enhanced.

The plasticizer of the third layer 300 may be the same with the plasticizer applied to the first surface layer 100. The detailed description about the type of the plasticizer is duplicated with above description thus further description will be omitted here.

Unlike the case where the pigment layer 160 forms a shade band to form the pigment portion 600 on some area of the film for glass lamination 900, the pigment portion 600 may be formed in a total area of the film for glass lamination 900 (refer to FIGS. 2A and 2B, and FIGS. 3A and 3B).

Figure 2A:
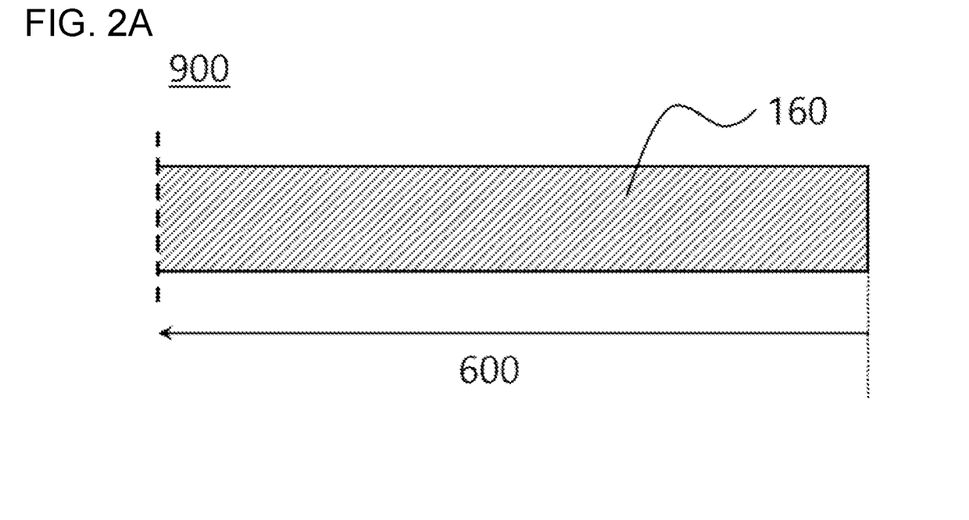
FIGS. 2A and 2B are conceptual views illustrating sections of a film for glass lamination including a pigment portion occupying the whole area of the film, respectively, according to one or more examples.
Figure 2B:
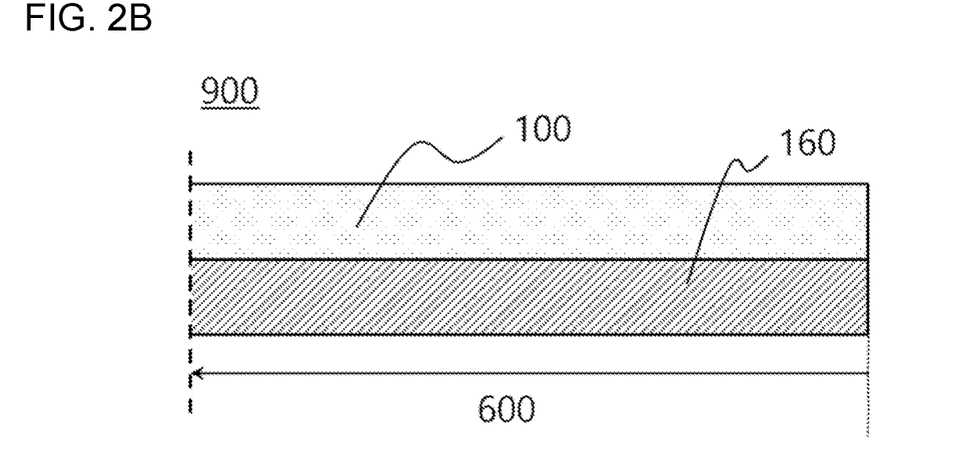
Figure 3A:
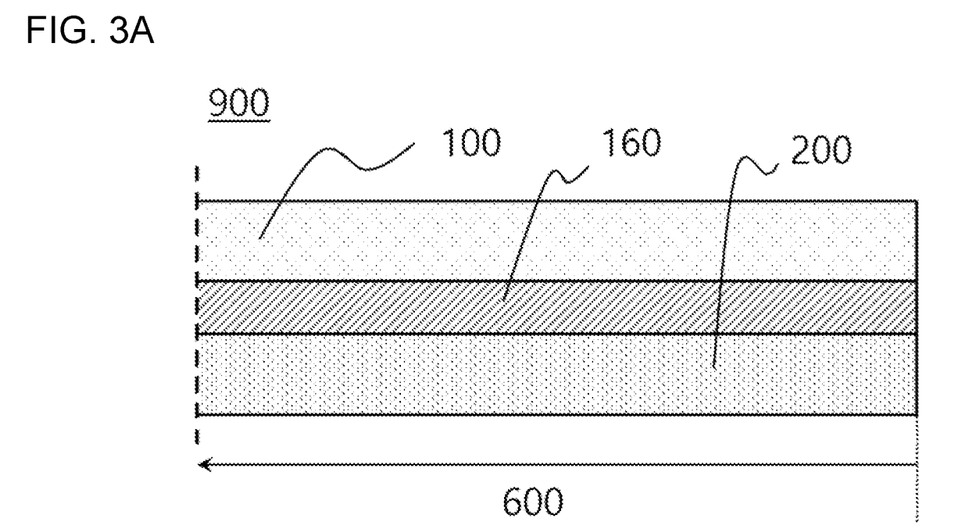
FIGS. 3A and 3B are conceptual views illustrating sections of a film for glass lamination including a pigment portion occupying the whole area of the film, respectively, according to one or more examples.
Figure 3B:
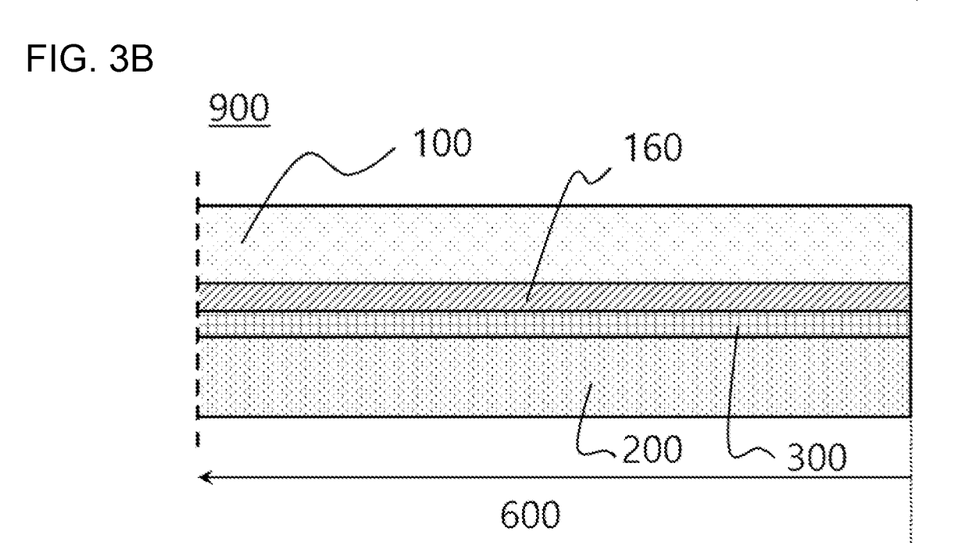

For example, the film for glass lamination 900 may consist of a pigment layer 160 (refer to FIG. 2A), or a pigment layer 160 may be located on one side of a first layer 100 (refer to FIG. 2B).

In addition, the film for glass lamination 900 may comprise a pigment layer 160 disposed between a first layer 100 and a second layer 200 (refer to FIG. 3A), at this time, the pigment layer 160 may have sound insulating performance simultaneously.

In addition, the film for glass lamination 900 may comprise a pigment layer 160 and a third layer 300 (refer to FIG. 3B), at this time, the third layer 300 may have sound insulating performance.

The film for glass lamination 900 may further comprise a fourth layer (not shown in drawings) having properties between the first layer 100 and the third layer 300 and disposed therebetween, and may further comprise a fifth layer (not shown in drawings) having properties between the second layer 200 and the third layer 300 and disposed therebetween.

The pigment portion 600 comprised in the film for glass lamination 900 may have a hue deviation of 0.4 or less. The hue deviation of the pigment portion refers to a value of hue deviation evaluated based on the result of evaluation with color-a and color-b values of CIE Lab (a color space defined by the International Commission on Illumination (abbreviated CIE)), respectively, and the color-a and color-b values have been measured by taking three portions (T, M, and B respectively as top, middle, and bottom) of 10 cm*10 cm from the pigment portion of 1 m*10 cm. Such a hue deviation of 0.4 or less means that the pigment portion 600 has considerably even color. When the pigment portion 600 is a shade band a hue value may be measured in the same distance from end portions of the film for glass lamination 900.

The hue deviation is calculated by equations below.

The average hue is an average value of hues in three portions that are T, M, and B (a and b values of CIE Lab) and calculated by Equation (1) below.

$$\text{Average Hue (CIE\_mean)} = (T+M+B)/3 \quad \text{Equation (1):}$$

Where T, M, and B refer to hue values of T, M, and B, respectively (a orb value of CIE Lab, respectively).

Transmittance deviation is a difference of transmittance in each portion and average transmittance (absolute value) and calculated by Equation (2) below.

$$[|(T-\text{CIE\_mean})|+|(M-\text{CIE\_mean})|+|(B-\text{CIE\_mean})|]/3 \quad \text{Equation (2):}$$

Where CIE_mean refers to an average hue value (a or b value of CIE Lab, respectively), and T, M, and B refer to hue values of T, M, and B, respectively (a or b value of CIE Lab, respectively). The hue value and the average hue value are calculated by applying the average transmittance and transmittance deviation corresponding to color-a value of CIE Lab, and the average transmittance and transmittance deviation corresponding to color-b value of CIE Lab, respectively.

For example, the pigment portion 600 may have a hue deviation of 0.001 to 0.4, or 0.001 to 0.20. Such a low hue deviation is thought to be the result obtained by improving dispersion stability of pigments due to inclusion of a trioxane-based compound in example embodiments.

The film for glass lamination 900 also has excellent moisture resistance.

Specifically, the film for glass lamination 900 may show a difference in haze value within 15% after a moisture resistance test, which includes digesting the film in deionized water of 50° C. for 3 hours, compared to a haze value of the film for laminating glass before the moisture resistance test.

The film for glass lamination 900 may further contain an additive selected from the group consisting of an antioxidant, a heat stabilizer, a UV absorber, a UV stabilizer, an IR absorber, a glass adhesion regulator, and combinations thereof. The additive may be comprised at least one layer within the layers as above, and due to inclusion of the additive, long-term durability such as thermal stability and light stability, and anti-scattering performance of the film can be enhanced.

As the antioxidant, a hindered amine-based antioxidant or a hindered phenol-based antioxidant may be used. Specifically, on the process of manufacturing polyvinyl butyral (PVB) which needs a processing temperature of 150° C. or higher, a hindered phenol-based antioxidant may be used. The hindered phenol-based antioxidant, for example, may be Irganox 1976, 1010, or so on available from BASF SE.

As the heat stabilizer a phosphite-based heat stabilizer may be used considering suitability with an antioxidant. The heat stabilizer, for example, may be Irgafos 168 available from BASF SE.

As the UV absorber, Chemisorb 12, Chemisorb 79, Chemisorb 74, or Chemisorb 102 available from CHEMIPRO KASEI KAISHA, LTD or Tinuvin 328, Tinuvin 329, or Tinuvin 326 available from BASF SE may be used. As the UV stabilizer, Tinuvin available from BASF SE may be used. As the IR absorber, ITO, ATO, or AZO may be used, and as the glass adhesion regulator, a salt of a metal such as magnesium (Mg), potassium (K), sodium (Na), epoxy-based modified silicon (Si) oil, or a mixture thereof may be used, but the present disclosure is not limited thereto.

The film for glass lamination 900 may have a total thickness of 0.4 mm or more, for example, of 0.4 to 1.6 mm, of 0.5 to 1.2 mm, or of 0.6 to 0.9 mm. The film for glass lamination is applied to the manufacture of laminated glass therefore mechanical strength or sound insulation performance thereof may be enhanced as the thickness is increased, however considering minimal legal performance, cost and weight reduction, the range of thickness as above is suitable for manufacture of the film satisfying various conditions.

The thickness of the first layer 100 and the second layer 200 may be 0.01 to 0.06 mm, or 0.02 to 0.05 mm, respectively independently.

The thickness of the third layer 300 may be 0.04 to 0.20 mm, 0.07 to 0.18 mm, or 0.09 to 0.15 mm.

When the pigment layer 160 is applied for a shade band, the thickness may be applied as a thickness applied in a shade band in general.

When the pigment layer 160 is applied to the front, the thickness may be adjusted depending on a shade of color required.

Figure 4:
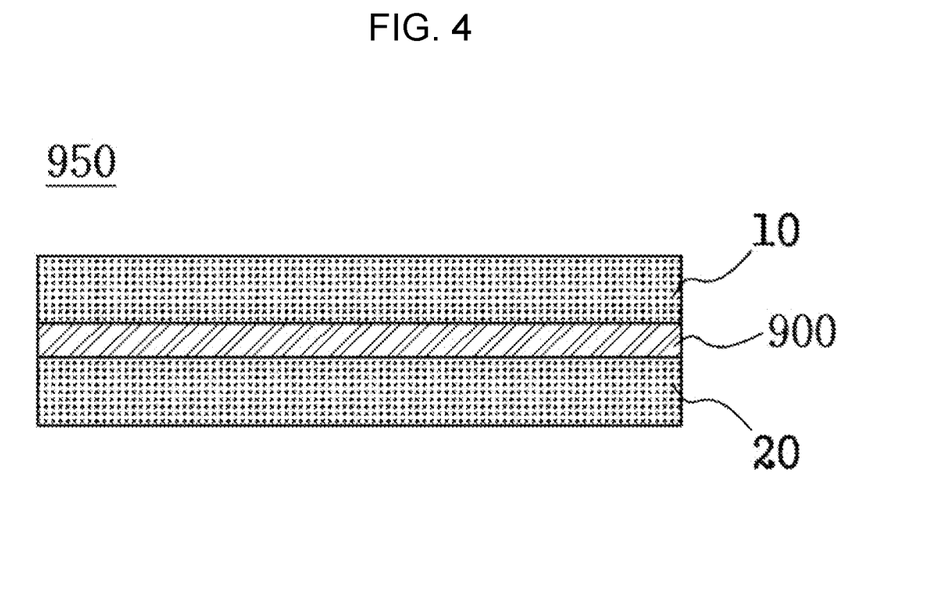
FIG. 4 is a conceptual view illustrating a section of laminated glass according to one or more examples.
Figure 5:
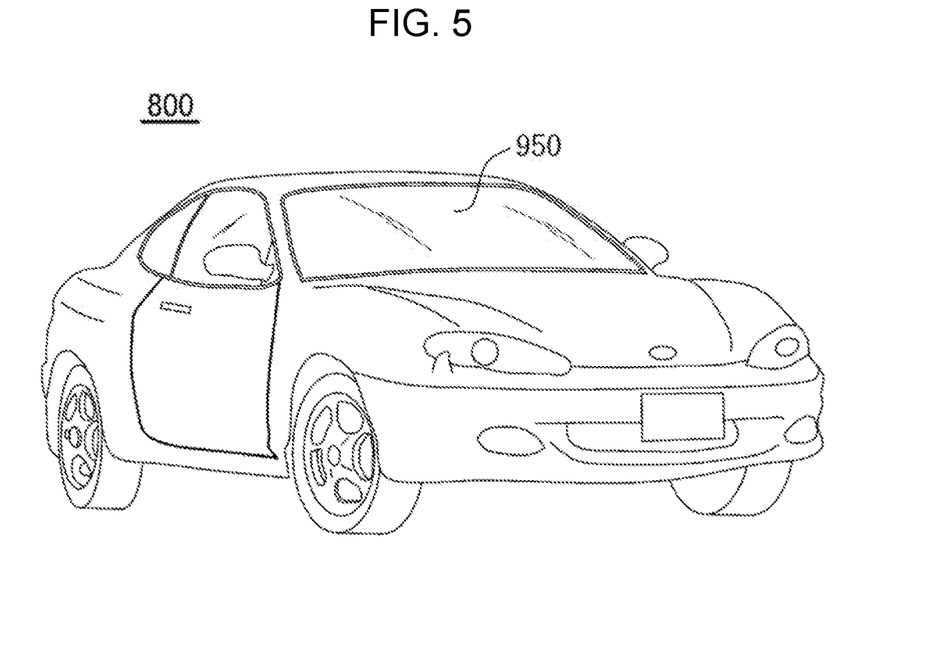
FIG. 5 is a conceptual view illustrating an example of laminated glass applied to an automobile as one example of vehicles according to one or more examples.

FIG. 4 is a conceptual view illustrating a section of laminated glass according to one or more examples, and FIG. 5 is a conceptual view illustrating an example of laminated glass applied to an automobile as one example of a vehicle according to one or more examples. Hereinafter, referring FIG. 4 to FIG. 5 a light transmitting laminate and a vehicle will be described.

A light transmitting laminate 950 according to one or more examples will be described. the light transmitting laminate 950 comprises a laminate in which the film for glass lamination 900 described above is disposed between two light transmitting layers 10, 20.

The two light transmitting layers 10, 20 specifically may be glass, but a light transmitting panel may be used, for example, a material like a plastic is also applicable.

The description about specific structure, composition, characteristics, the method of manufacturing and so on is duplicated with the above description thus further description will be omitted here.

To an automobile 800 which is one example of a vehicle according to one or more examples, a laminated glass 950 which is one example of a light transmitting laminate may be applied as a windshield.

The windshield is one equipped for blocking wind from the outside, and for the user of the vehicle to observe the outside with the naked eye, and the laminated glass 950 described above may be applied thereto.

The vehicle 800 comprises a body forming the body of the vehicle, a driver attached to the body (engine, etc.), a drive wheel attached to be rotatable to the body, a connector connecting the drive wheel and the driver; and a windshield attached to a part of the body, which is a light transmitting laminate blocking wind from outside.

The vehicle 800 may be applied to vehicles applied with a windshield, representatively the vehicle 800 may be an automobile, and the body, the driver, the drive wheel, and the connector may be applied without limit if they are units generally applied to an automobile.

The automobile that is an example of the vehicle 800 may be applied with the laminated glass 950 as a windshield, and may give excellent light transmission performance, impact resistance, and penetration resistance to the entire area of laminated glass 950 while providing the automobile with excellent optical properties.

Hereinafter, example embodiments of the present disclosure will be described in more detail below.

Manufacture of a Film for Glass Lamination

1) Preparation of a Polyvinyl Acetal Resin

Manufacture of a Polyvinyl Butyral Resin: A polyvinyl alcohol resin having an average polymerization degree of 1700 and a saponification degree of 99% was mixed with a n-butyl aldehyde, thereby obtaining a polyvinyl butyral resin having butyral group of 56.1 mol % and hydroxyl group of 43.0 mol %.

2) Preparation of an Additive Mixture

Irganox 1010 and Irgafos 168 in an amount of 0.1 parts by weight respectively, Tinuvin P in an amount of 0.3 parts by weight, potassium acetate (K ac) in an amount of 0.022 parts by weight and magnesium acetate (Mg Ac) in an amount of 0.028 parts by weight were mixed, thereby preparing an additive mixture in an amount of 0.55 parts by weight.

3) A Method of Preparing a Pigment Dispersion Liquid

A pigment mixture was mixed with a trioxane-based compound and a plasticizer in liquid form, thereby preparing a pigment dispersion liquid. The detailed composition of the pigment mixture, the trioxane-based compound, and the plasticizer is shown in Table 1 below.

The pigment dispersion liquid was prepared using ROTATE RING MILL available from ARMSTEC.INC.CO., LTD. As beads charged inside a vessel, zirconium oxide with a size of 0.5 mm was used, and grinding and dispersing of pigments were carried out at the same time for 30 minutes, after setting the rate of an internal stirrer (AGITATOR) to be 1500 RPM and setting the rate of an external stirrer to be 100 RPM.

As the pigments, green: Pigment green 7 (CITY CAT OVERSEAS CHEMICALS LTD), blue: Pigment blue 15:3 (HANGZHOU XCOLOR CHEMICAL COMPANY), red: Pigment red 122 (LILY GROUP CO., LTD), yellow: Pigment yellow (HERMETA CORPORATION CO., LTD) were applied respectively.

TABLE 1

| Pigment Dispersion No. | Pigment (parts by weight) | | | | Dispersion Stabilizer (parts by weight) Tripropyl Trioxane (2,4,6-Tripropyl-1,3,5-trioxane) | Plasticizer (parts by weight) 3G8 (Triethylene glycol 2-ethyl hexanoate) |
|---|---|---|---|---|---|---|
| | RED | GREEN | BLUE | YELLOW | | |
| A | 1.3 | 0.5 | 0.7 | 0.5 | 1 | 96 |
| B | 1.3 | 0.5 | 0.7 | 0.5 | 3 | 94 |
| C | 1.3 | 0.5 | 0.7 | 0.5 | 5 | 92 |
| D | 1.3 | 0.5 | 0.7 | 0.5 | 0 | 97 |

2) Manufacture of a Film for Glass Lamination

MANUFACTURE OF A FILM IN EXAMPLE 1

An additive mixture of 0.55 parts by weight, a polyvinyl butyral resin in an amount of 71.95 parts by weight, and 3G8 plasticizer in an amount of 27.50 parts by weight were put into a twin screw extruder (X1) to be extruded. And an additive mixture of 0.55 parts by weight, a polyvinyl butyral resin in an amount of 71.25 parts by weight, and a pigment dispersion liquid (A) in an amount of 28.20 parts by weight were put into a twin screw extruder (X2) to be extruded.

A resin extruded in an extruder (X2) was formed into a film with the same structure of FIG. 1A through a feed block and a T-die, thereby manufacturing a sheet with a width of 1.2 m and a thickness of 760 μm (microns). From both end portions of the manufactured film each 0.1 m was cut (trimmed) and finally a film with a width of 1 m was winded on a roll, thereby obtaining a sample in Example 1.

MANUFACTURE OF A FILM IN EXAMPLE 2

Example 2 was manufactured in the same manner as in Example 1 except using pigment dispersion liquid (B).

MANUFACTURE OF A FILM IN EXAMPLE 3

Example 3 was manufactured in the same manner as in Example 1 except using pigment dispersion liquid (C).

MANUFACTURE OF A FILM IN COMPARATIVE EXAMPLE 1

Comparative Example 1 was manufactured in the same manner as in Example 1 except using pigment dispersion liquid (D).

(Property Evaluation of the Film for Glass Lamination)

1) Hue Measurement (CIE Lab)

For measurement of visible light transmittance deviation by portion, samples by location were taken by the method as follows using the manufactured film.

Figure 6:
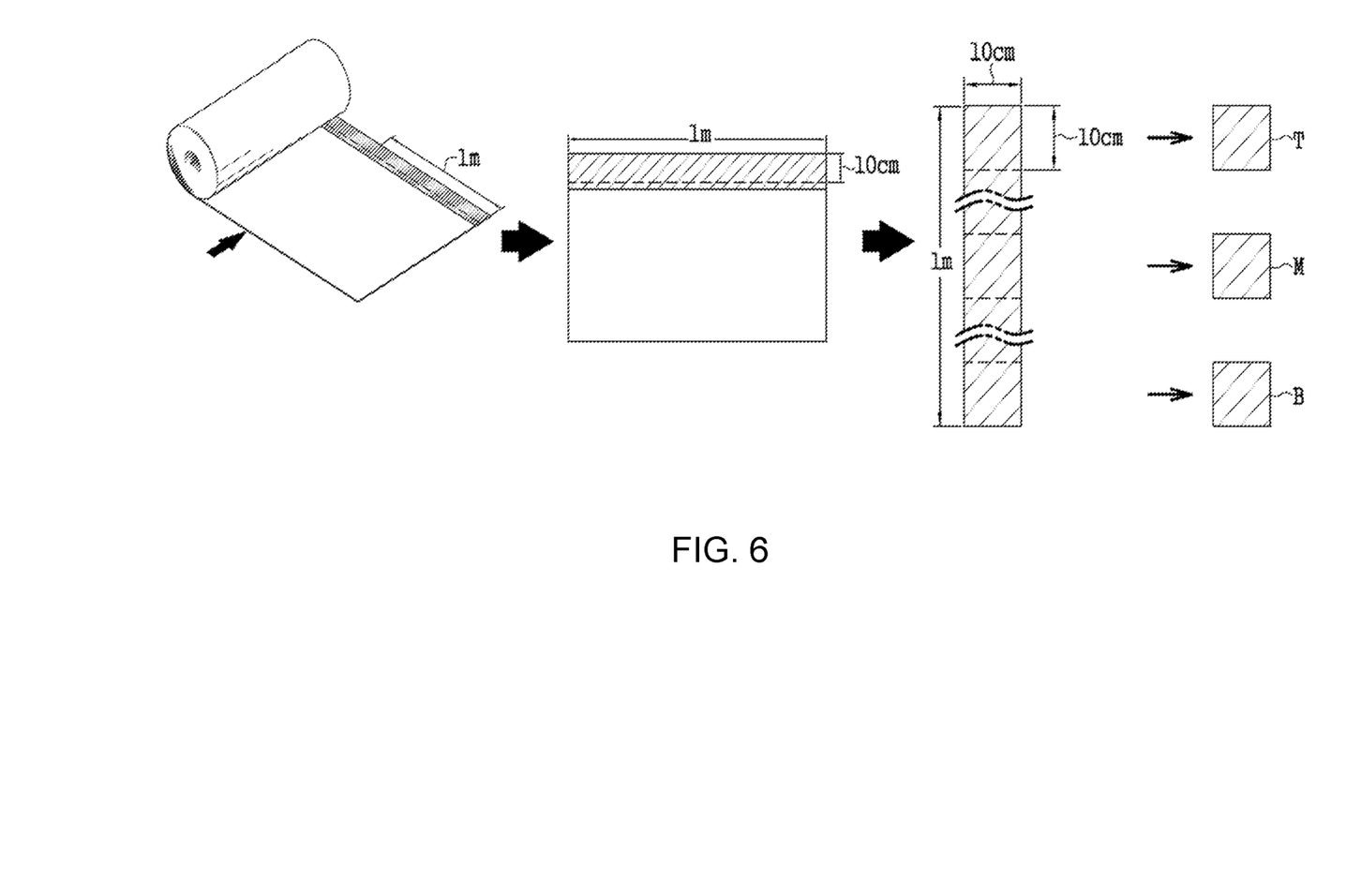
FIG. 6 is a conceptual view illustrating a method of hue measurement applied in one or more experimental examples.

A sample of 1 m with the length direction was obtained from a film winded in the form of a roll. After that only each area of 10 cm with the width direction from the end portions of the colored part with a pigment was taken. Among the corresponding samples, a sample of 10*10 cm obtained by cutting the part of 10 cm from the top was represented as (T), a sample obtained by cutting the part of 10 cm from the bottom in the same way was represented as (B), and a sample of 10*10 cm obtained from the middle was represented as (M) (refer to FIG. 6).

Taken samples were overlapped with a PET film in which silicon was coated to both sides, and laminated for 10 minutes in a vacuum laminator of 150° C. so that the unevenness of the surface was eliminated thereby making samples with a smooth surface.

For measuring the hue in the middle of the film sample made like this, UltraScan Pro available from HUNTER LAB was used, and color-a value and color-b value were obtained in accordance with D65, 10 degree of CIE 1964 standard.

2) Average Hue Deviation

Average hue deviation is the average value of the hue of three portions T, M, and B (a and b values of CIE Lab), and calculated by Equation (1) below.

$$\text{Average Hue (CIE\_mean)} = (T+M+B)/3 \quad \text{Equation (1):}$$

Where T, M, and B refer to hue values of T, M, and B (a or b value of CIE Lab), respectively.

Transmittance deviation is the difference (absolute value) of the transmittance and average transmittance in each part, and calculated by Equation (2) below.

$$[|(T-\text{CIE\_mean})|+|(M-\text{CIE\_mean})|+|(B-\text{CIE\_mean})|]/3 \quad \text{Equation (2):}$$

Where CIE_mean refers to the average hue value, and T, M, and B refer to hue values of T, M, and B, respectively. The hue value and average hue value is calculated with a or b values of CIE Lab applied, respectively.

3) Moisture Resistance Test

A sample with width*length 10 cm*10 cm cut from a manufactured sheet was digested for 3 hours in a thermostat which had been full with DI-WATER of 50° C. and taken out to be evaluated with a haze value (%). If the variation of a haze value (%) measured before being put into the thermostat and a haze value (%) measured after being put into the thermostat was 15% or less, it was evaluated as Pass, and if the difference was 15% or more, it was evaluated as Fail.

Evaluation of haze was carried out by measuring the middle portion of the sample using NDH 5000W available from NIPPON DESHOKU CO., LTD in accordance with JIS K 7105 standard.

4) Storage: Observation of Whether or Not Agglomeration

Ink in which a pigment was dispersed was put in a transparent plastic bottle with 1 L capacity and sealed up, and after that temporal variation thereof was checked. After 3 days, 7 days, and 30 days from being dispersed a state of the ink was observed with the naked eye, and it was represented as Fail if agglomeration occurred, or represented as Pass if agglomeration did not occur.

The results evaluated above are shown in Table 2 and Table 3 below, respectively.

TABLE 2

| No. | Type of the Pigment dispersion Liquid | Color-a | | | | Color-b | | | |
|---|---|---|---|---|---|---|---|---|---|
| | | T | M | B | Average Value | T | M | B | Average Value |
| Example 1 | A | −11.44 | −11.58 | −11.81 | −11.61 | −13.67 | −13.72 | −13.83 | −13.74 |
| Example 2 | B | −11.76 | −11.57 | −11.57 | −11.63 | −13.69 | −13.59 | −13.54 | −13.61 |
| Example 3 | C | −11.35 | −11.45 | −11.56 | −11.45 | −13.68 | −13.72 | −13.58 | −13.66 |
| Comparative Example 1 | D | −10.25 | −9.08 | −12.23 | −10.52 | −14.08 | −14.00 | −13.08 | −13.72 |

TABLE 3

| No. | Parts by Weight of the Pigment Dispersion Liquid | Parts by Weight of the Additive | Parts by Weight of the PVB resin | Storage Stability of the Pigment Dispersion Liquid | Moisture Resistance | Average Hue Deviation | |
|---|---|---|---|---|---|---|---|
| | | | | | | color-a | color-b |
| Example 1 | 28.2 | 0.55 | 71.25 | Pass | Pass | 0.133 | 0.060 |
| Example 2 | 28.2 | 0.55 | 71.25 | Pass | Pass | 0.084 | 0.056 |
| Example 3 | 28.2 | 0.55 | 71.25 | Pass | Fail | 0.071 | 0.053 |
| Comparative Example 1 | 28.2 | 0.55 | 71.25 | Fail | Pass | 1.140 | 0.427 |

Referring to Table 2 and Table 3, it was verified that the average hue deviation was remarkably lower in samples of Examples 1 to 3, compared to Comparative Example 1. This is thought to be the result of a trioxane-based compound functioning as a dispersion stabilizer for pigments. It was evaluated that if such a trioxane-based compound was applied, various pigments were applicable regardless of whether they had compatibility with a plasticizer or a polyvinyl acetal resin.

In addition, the storge stability of a pigment dispersion liquid is also excellent in Examples 1 to 3, and it is thought that this can enhance convenience of work as well as dispersibility because the gelation of the pigment dispersion liquid is prevented. However, it was shown that if a trioxane-based compound was used in an excessive amount the moisture resistance might be degraded a little from the present composition.

The film for glass lamination, and laminated glass including the film for glass lamination according to example embodiments described herein include a pigment dispersion liquid having improved stability, dispersibility, and compatibility, so that a pigment portion which is stabler and has excellent optical properties may be formed, and that may also enhance workability and convenience in processes of manufacturing the film.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A film for glass lamination comprising:
    a pigment portion occupying some or a whole of the film,
    wherein the pigment portion comprises an extruded pigment layer comprising a mixture of a polyvinyl acetal resin, a pigment, a plasticizer, and a trioxane-based compound,
    wherein the trioxane-based compound has a structure of Formula 1 below;

[Formula 1]

in formula 1, $R_1$, $R_2$, and $R_3$ are each independently hydrogen or alkyl group having 1 to 5 carbon atoms, expect that at least one of $R_1$, $R_2$, and $R_3$ is an alkyl group having 1 to 5 carbon atoms;
    wherein the trioxane-based compounds is comprised in an amount of 0.001 to 3 wt % with respect to a total weight of the extruded pigment layer.

2. The film for glass lamination of claim 1,
    wherein the pigment portion has a hue deviation of 0.4 or less.

3. The film for glass lamination of claim 1,
    wherein the extruded pigment layer comprises the pigment and the trioxane-based compound in a weight ratio of pigment to trioxane-based compound of 1:0.05 to 3.

4. The film for glass lamination of claim 1,
wherein the pigment is comprised in an amount of 0.001 to 5 wt % with respect to a total weight of the pigment portion.

5. The film for glass lamination of claim 1,
wherein the trioxane-based compound has carbon atoms of 9 to 15.

6. The film for glass lamination of claim 1,
wherein a haze value of the film for laminating glass may have a difference within 15% after a moisture resistance test, which comprises digesting the film in deionized water of 50° C. for 3 hours, compared to a haze value of the film for laminating glass before the moisture resistance test.

7. A light transmitting laminate comprising:
a first light transmitting layer, the film for glass lamination of claim 1 located on one side of the first light transmitting layer, and a second light transmitting layer located on one side of the film for glass lamination.

8. A vehicle comprising the light transmitting laminate of claim 7.

9. A pigment dispersion liquid comprising:
a pigment, a plasticizer, and a trioxane-based compound,
wherein the trioxane-based compound has a structure of Formula 1 below;

[Formula 1]

in formula 1, $R_1$, $R_2$, and $R_3$ are each independently hydrogen or alkyl group having 1 to 5 carbon atoms, expect that at least one of $R_1$, $R_2$, and $R_3$ is an alkyl group having 1 to 5 carbon atoms;

wherein the trioxane-based compounds is comprised in an amount of 0.1 to 30 wt % with respect to a total weight of the pigment dispersion liquid.

10. The pigment dispersion liquid of claim 9,
wherein the plasticizer is comprised in an amount of 68 to 98 wt % with respect to a total amount of the pigment dispersion liquid.

11. The pigment dispersion liquid of claim 9,
wherein the pigment is comprised in an amount of 1 to 10 wt % with respect to a total amount of the pigment dispersion liquid.

12. A mixture, comprising:
the pigment dispersion liquid of claim 9, and
a polyvinyl acetal resin,
wherein the pigment dispersion liquid is present in an amount of 2 to 75 parts by weight based on the polyvinyl acetal resin in an amount of 100 parts by weight.

13. The pigment dispersion liquid of claim 9,
wherein the pigment dispersion liquid does not generate agglomeration for 30 days or more after being prepared.

* * * * *